Figure 1:
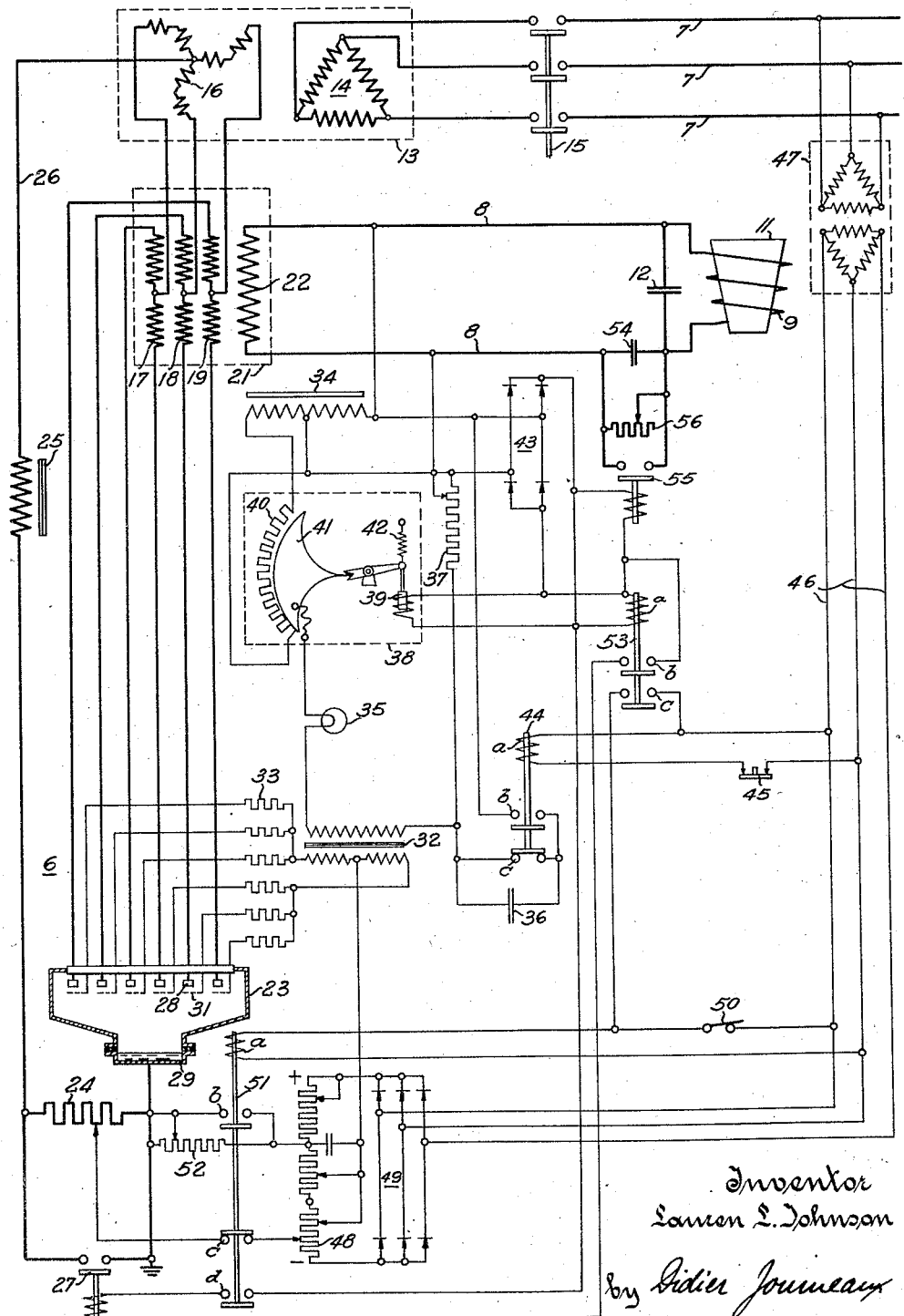

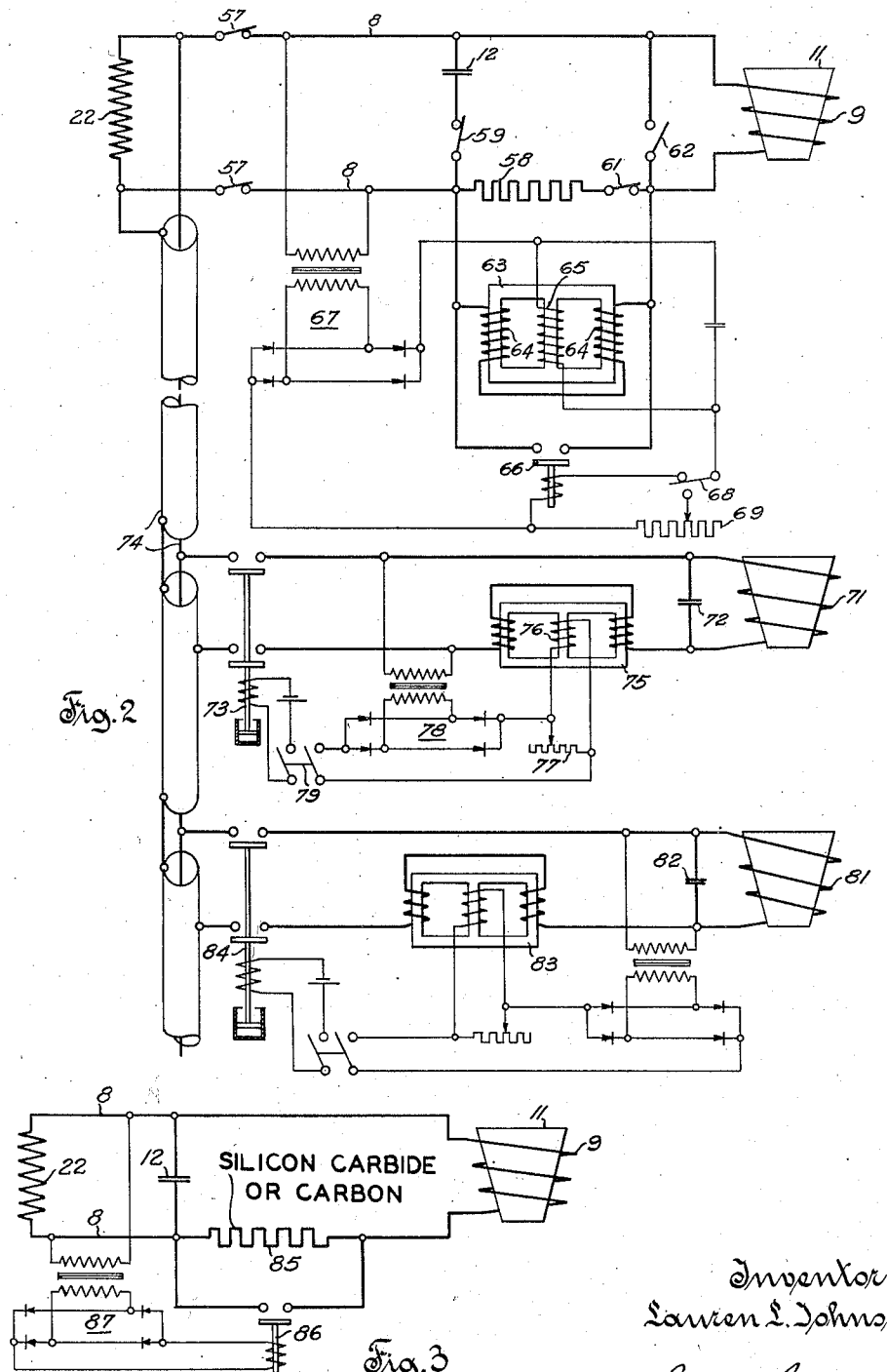

Patented Dec. 30, 1947

2,433,563

UNITED STATES PATENT OFFICE 2,433,563

ELECTRIC VALVE CONVERTING SYSTEM AND METHOD OF OPERATING THE SAME

Lauren L. Johnson, Milwaukee, Wis., assignor to Allis-Chalmers Manufacturing Company, Milwaukee, Wis., a corporation of Delaware Application December 26, 1944, Serial No. 569,792

25 Claims. (Cl. 172—281)

1

This invention relates in general to improvements in electric valve converting systems and more particularly to means for initiating the flow of high frequency alternating current through a load circuit energized from a low frequency alternating current circuit or from a direct current through a converter comprising a plurality of electric valves of the discontinuously controllable type.

When high frequency alternating current is supplied to a load circuit through a converting system comprising discontinuously controllable electric valves, the flow of current through the different valves is periodically commutated by suitable means, preferably by the action of the energy stored in the load circuit, under the control of suitable potentials impressed on the control electrodes of the valves from the load circuit.

To initiate the operation of a converter connected to a load circuit which is not already energized from another converter or from a generator, energy for the first commutation may be stored in a capacitive element of the load circuit by the flow through the converter and through the load circuit of a current impulse or of a succession of impulses. The rate of change of the current forming such impulses, however, is limited to a relatively low value by the inductance of the converter circuits. This circumstance is a source of difficulties, as the load circuit frequently supplies current to the inductor coils of induction furnaces, which coils have a relatively low inductance. The inductor coils thus offer only a negligible impedance to alternating currents of frequencies materially below operating frequency and to other slowly varying currents such as the currents induced in the load circuit during starting operation of the converter. The result is that it is often difficult to store sufficient energy in the capacitive element of the load circuit to produce the desired commutation of the valve currents.

It is therefore advantageous to provide, in series with the inductor coils connected to the load circuit, suitable impedance elements imparting to the load circuit a substantial impedance for all frequencies at least up to normal operating frequency, whereby energy may be stored in the load circuit to initiate commutation between the valves of the converter. The impedance means may thereafter be disconnected or short circuited to reduce the losses in the load circuit, which then retains a substantial impedance at normal operating frequency but assumes

2 a negligible impedance for a range of frequencies between zero frequency and a frequency well below normal operating frequency. The starting impedance means may consist of a resistor which may be gradually short circuited by a saturable reactor, which in turn may be short circuited by a switch. The resistor may be of substantially constant value or may be of the type having a resistance which decreases upon flow of current through the resistor. A capacitor shunted by a resistor may also be used instead of a resistor only.

When a plurality of loads such as inductor coils are associated with a common converter, the latter is preferably put in operation while it is connected to a single load provided with the additional impedance means above set forth. The other loads to be connected afterwards to the converter are preferably provided with suitable impedance means for increasing their impedance to a relatively high value during switching operations in which they are involved to thereby insure the continuity of supply of commutating current to the converter from the load circuit.

The saturable reactor utilized in the process of energizing the load circuit may also be utilized for regulating the flow of current through the converter. When inductor coils are connected to a point of a load circuit remote from the converter, each coil is preferably associated with a capacitor for raising the power factor of the load circuit to unity. The commutating current of the converter is then supplied by an additional capacitor connected to a point of the load circuit close to the converter.

It is therefore an object of the present invention to provide an electric valve converter with a load circuit effective to supply commutating current to the converter both during normal operation and during initiation of the operation of the converter.

Another object of the present invention is to provide an electric valve converter with a load circuit in which sufficient energy may be stored to initiate commutating operation of the converter.

Another object of the present invention is to provide an electric valve converter with a load circuit which may be modified from a condition favorable to initiation of the commutating operation of the converter to a condition corresponding to the efficient supply of energy to the load circuit.

Another object of the present invention is to provide a connection between an electric valve converter and a load circuit whereby the flow of current between the converter and the load circuit may be established and interrupted without disturbance in the operation of the converter.

Objects and advantages other than those above set forth will be apparent from the following description when read in connection with the accompanying drawing, in which:

Fig. 1 diagrammatically illustrates one embodiment of the present invention consisting of a converter supplying energy from an alternating current supply circuit to an alternating current load circuit in which the impedance of the load circuit is initially increased by insertion of a capacitor, shunted by a resistor, in series with the load circuit;

Fig. 2 diagrammatically illustrates a portion of a modified embodiment of the present invention in which the impedance of different branches of the load circuit may be varied by means of saturable reactors; and Fig. 3 diagrammatically illustrates a portion of another modified embodiment of the present invention in which the impedance of the load circuit may be varied by means of a current responsive resistor.

Referring more particularly to the drawing by characters of reference, Fig. 1 diagrammatically illustrates a converter 6 connected to a three-phase supply circuit 7 energized from any suitable generator (not shown) operating at a relatively low frequency to supply alternating current of relatively high frequency to a single-phase load circuit 8. It will be understood, however, that circuits 7 and 8 may be of any numbers of phases and may operate at any frequencies that may be required. The load circuit is assumed to be connected with an inductive winding 9, which may be an inductor coil associated with a crucible 11 to form a coreless induction furnace. Coil 9 is connected in parallel with energy storage means such as a capacitor 12 of such capacitance as to overbalance the inductance of coil 9 at operating frequency, whereby load circuit 8 assumes a capacitive character and supplies commutating current to converter 6.

The converter comprises an input or low frequency transformer 13 having a primary winding 14 divided into a plurality of phase portions severally connected with the different conductors of circuit 7 through a switch 15. The secondary winding 16 of transformer 13 is divided into a plurality of phase portions defining a neutral point and so arranged as to preclude dissymmetrical magnetization of the transformer core upon flow of unidirectional current through the winding.

The terminals of winding 16 are severally connected with the midtaps of primary windings 17, 18, 19 of an output or high frequency transformer 21 having a secondary winding 22 connected with load circuit 8. The terminals of windings 17, 18, 19 are connected with the neutral point of winding 19 through a plurality of electric valves 23 of the discontinuously controllable type, an optional resistor 24 and a reactor 25 to complete an intermediate circuit 26 inductively connected with circuits 7 and 8 for the transfer of energy therebetween. A switch 27 serves to short circuit resistor 24 when starting of the converter is completed, and is omitted when circuit 26 is not provided with a resistor.

Valves 23 are provided with anodes 28 which may be arranged each with the associated cathode in a separate casing or which may all be arranged in a common casing provided with a common mercury cathode 29. The cathode is provided with the usual means (not shown) for initiating and maintaining the emission of electrons thereat.

The conductivity of valves 23 is controlled by means of suitable control electrodes 31 which may be grids, at least when the continuously emissive type of cathode is provided. Grids 31 also serve to control the density of ionization in the spaces adjacent anodes 28 during the idling periods thereof to prevent failure of the valve action of the anodes. Although only one grid is shown associated with each anode 28 it will be understood that additional grids may be provided, the grids being suitably arranged, dimensioned and energized for further reducing the density of ionization in the vicinity of the anodes. Valves 23, if necessary, may also be provided with suitable external or internal water cooled elements (not shown) for reducing the vapor density within the casing to thereby assist in controlling the density of ionization.

Grids 31 may be energized in two groups of three from a transformer 32 through current limiting resistors 33 of such low resistance as to offer relatively little opposition to the flow of so-called inverse current therethrough resulting from the deionizing action of the grids. Transformer 32 is energized from circuit 8 through an auto-transformer 34, a resistor 35 such as a metallic filament lamp operating at a relatively high temperature, and a phase shifting circuit comprising a capacitor 36 and a variable resistor 37. A portion of auto-transformer 34 may be bridged by a resistor 40 forming part of a regulator 38 provided with a coil 39 actuating a sector 41 against the action of a spring 42. Coil 39 may be energized in response to the voltage of circuit 8 through a rectifier 43 of any suitable type.

The connection of capacitor 36 with resistor 37 is controlled by a relay 44 having its coil connected with circuit 7 through a push-button switch 45, a control circuit 46 and a transformer 47. Unidirectional potentials may be impressed on grids 31 from a voltage divider 48 energized from circuit 46 through a suitable rectifier 49.

Starting of converter 6 is preferably initiated by means of a switch 50 connecting circuit 46 with the coil 51a of a relay 51. The relay is provided with contacts 51b bridging a resistor 52 connected between voltage divider 48 and cathode 29. Further contacts 51c connect voltage divider 48 with a tap of resistor 24. The coil of switch 27 is connected with rectifier 43 through contacts 51d and through contacts 53b of another relay 53. The coil 53a of relay 53 is energized from rectifier 43. Contacts 53c are connected across switch 51.

The resistance of coil 9 is made as low as practical to reduce the losses in the coil, and its inductance is also relatively low as a result of the absence of iron core. While the impedance of coil 9 may be caused to assume any desired value of the operating frequency of circuit 8 by making the operating frequency sufficiently high, the impedance of the coil is usually negligible for a limited range of frequencies extending from zero frequency to a frequency well below operating frequency. To increase the impedance of circuit 8 to a substantial value for all frequencies within this range when circuit 8 is deenergized, the parallel combination of coil 9 and capacitor 12 is connected in series with another capacitor 54, which may be short circuited in response to energization of circuit 8 by a switch 55 having its closing coil energized from rectifier 43. A resistor 56 may be connected in parallel with capacitor 54 to limit the voltage appearing across the terminals of the capacitor.

In operation, the elements of the system being in the positions shown, energization of circuit 7 causes the supply of current therefrom to circuit 46 and rectifier 49, which supplies current to voltage divider 48 to momentarily impress a positive potential on grids 31 through contacts 51c. Coil 51a is energized from circuit 46 and relay 51 operates to substitute for the positive grid potential a negative potential impressed on the grids through contacts 51b. Coil 44a is likewise energized and relay 44 connects capacitor 36 in series with resistor 37. Cathode 29 is rendered emissive and is maintained in emissive condition by means of an auxiliary arc as is well known.

Switch 15 may then be closed and operation of the converter may be initiated by opening switch 50 to deenergize coil 51a. Relay 51 returns to the position shown, thereby causing impression of a positive potential from voltage divider 48 on all grids 31. All valves 23 are thereby rendered conductive and anodes 28 operate sequentially in pairs at the full voltage of winding 16. The anode currents are pulsating and combine at cathode 29 to form a pulsating unidirectional current flowing through resistor 24 and reactor 25. The rate of change of the cathode current however, is limited to a relatively low value by the inductance of reactor 25. The voltage drop in resistor 24 is pulsating and, being superimposed in a negative sense on the positive potential impressed on the grids from voltage divider 48, causes valves 23 to become conductive toward the end of the half cycles of the voltages impressed thereon from winding 15 to limit the flow of current through the valves to a predetermined value.

The flow of pulsating currents through valves 23 and windings 17, 18, 19 results in the appearance of transient voltages in winding 22 and in circuit 8. Any such transient voltage results in capacitor 54 becoming charged with stored energy, the charging current of capacitor 54 flowing principally through coil 9 which by-passes capacitor 12. Upon disappearance of the transient voltage capacitor 54 discharges in an oscillatory manner through coil 9 and winding 22 with a frequency of oscillation which is comparable to the normal operating frequency of circuit 8.

If these oscillations exceed a predetermined magnitude capacitor 54 supplies to winding 22 sufficient stored energy to cause commutation between the anodes connected with the terminals of one of windings 17, 18, 19. At the same time, these oscillations result in the selective impression on the two groups of grids 31 of alternating potential components of the same frequency and of proper phase from circuit 8 through capacitor 36, contacts 44b, resistor 37, auto-transformer 34, resistor 40, lamp 35, transformer 32 and resistors 33. Normal operation of the converter for the transfer of energy from circuit 7 to circuit 8 is thereby established, the different valves being rendered conductive in sequence by the joint action of the positive potential component impressed on grids 31 from voltage divider 48 and of the alternating component impressed on the grids from transformer 32 to convert the current supplied to the valves from winding 16 into current impulses supplied sequentially to the different portions of windings 17, 18, 19, as is well known.

As a result of the connection of transformer 32 with circuit 8 through resistor 37 and capacitor 36, the voltage of transformer 32 leads the voltage of circuit 8 and each valve is rendered conductive before the flow of current through the previously conductive valve has ceased. The voltage relations in the valve circuits are then such that energy stored in the load circuit may extinguish the flow of current through the outgoing valve.

The flow of current through windings 17, 18, 19 and through load circuit 8 therefore leads the voltage of the load circuit and the frequency of the system adjusts itself automatically to a value for which the phase angle between the voltages of circuit 8 and of transformer 32 and the power factor of the current in the load circuit are in proper relation to insure stable operation of the system. The load circuit is actually part of the converter, as in the absence of load the converter is unable to function.

When normal current converting operation is established in the converter, the magnitude of the voltage of circuit 8 rises gradually to its normal value at a rate determined principally by the inductance of reactor 25. When the voltage reaches a predetermined value, relay 53 closes its contacts, thereby causing switch 27 to short circuit resistor 24. Contacts 53c close to cause relay 51 to again impress a negative potential component on grids 31 through contacts 51b and thereby facilitate the deionizing action of grids 31 between operating periods of anodes 28.

Switch 55 also operates to short circuit capacitor 54 and resistor 56 in response to energization of circuit 8, thereby decreasing the impedance of circuit 8 to a negligible value for a range of frequencies extending from zero frequency to a value well below operating frequency. At the normal operating frequency of circuit 8, however, coil 9 has a substantial impedance so that capacitor 12 is able to become charged during each half cycle of the voltage of circuit 8 to supply commutating current to valves 23. The entire load circuit 8 then has a substantial impedance at normal operating frequency and necessarily operates with a leading power factor, the load and commutation current flowing through the load circuit and winding 22 being the geometric sum of the leading current of capacitor 12 and the lagging current of coil 9.

At the time of initiation of the flow of current through converter 6 the filament of lamp 35 is cold and has a relatively high resistance. The voltage ratio of transformer 32 is so chosen that under such conditions grids 31 receive a sufficiently high alternating potential component from the transformer to effect the desired control of the valve currents. When the voltage of load circuit 8 gradually increases to its normal operating value, the filament of lamp 35 heats up and its resistance increases with the magnitude of the voltage of the load circuit to reduce the ratio of the magnitudes of the grid alternating potential component and of the voltage of the load circuit. The voltage of transformer 32 is thereby prevented from becoming excessive during normal operation.

Regulator 38 controls the flow of energy through converter 6 in such manner as to maintain the magnitude of the voltage of circuit 8 substantially constant. The frequency of the voltage of circuit 8 may vary in response to changes in the loading of coil 9, but the phase angle between the voltages of circuit 8 and of transformer 32 is substantially unaffected by such frequency changes. This result is obtained by so dimensioning the auto-transformer that the voltage of transformer 32 is substantially in phase with the voltage variations of the common point of resistor 37 and capacitor 36 resulting from variations in the frequency of circuit 8.

If the operation of converter 6 is interrupted as a result of a failure of commutation for example, switch 55 returns to the position shown in response to deenergization of circuit 8 to reinsert capacitor 54 and resistor 56 in circuit 8, thereby again increasing the impedance of circuit 8 to a substantial value for all frequencies below normal operating frequency. Relays 53 and 51 are deenergized and switch 27 opens, and starting operation of the converter is immediately again initiated in the manner above set forth.

In the embodiment illustrated in Fig. 2 capacitor 12 and coil 9 are assumed to be connected with winding 22 of converter 6 at a point of circuit 8 proximate thereto through switches 57. The converter, which is not further illustrated in Fig. 2, is assumed to be connected as shown in Fig. 1 but capacitor 54 and resistor 56 are omitted. Circuit 8 is connected to a shunt circuit comprising coil 9 in series with a resistor 58 of sufficiently high resistance as to maintain the impedance of circuit 8 at a value comparable to its normal operating impedance for frequencies approaching zero frequency. Switches 59, 61, 62 may be provided for controlling the connections of capacitor 12, coil 9 and resistor 58 for the purpose of regulating the loading of circuit 8.

Resistor 58 is shunted by the inductive winding 64 of a reactor 63 having a saturating winding 65 for causing the impedance of winding 64 to vary from a value which is high relative to the resistance of resistor 58 to a value which is low relative to the resistance of resistor 58. Winding 64 and resistor 58 may be short circuited by a switch 66. Winding 65 may be energized from circuit 8 through a rectifier 67, a selector switch 68 and the coil of switch 66 or a regulating rheostat 69.

The load connected with circuit 8 may comprise a second inductor coil 71 and a capacitor 72 connected through a time delay switch 73 with a remote point of circuit 8 connected with winding 22 through a branch of the load circuit which, if it is of great length, may advantageously consist of a coaxial conductor 74. Initiation of the flow of current through coil 71 and capacitor 72 may be controlled by means of a reactor 75 having a saturating winding 76 bridged by an adjustable resistor 77. Winding 76 may be energized in response to the voltage of circuit 8 by means of a rectifier 78. Energization of coil 76 and of the closing coil of switch 73 may be controlled by a double pole switch 79.

The load may also comprise a further inductor coil 81 connected in parallel with a capacitor 82, the energization of which is controlled similarly to that of coil 71 and capacitor 72 by a reactor 83 and a switch 84. As shown in the drawing in connection with coil 81, the saturating winding of the reactor may be energized from the terminals of the capacitor and of the inductor coil instead of being energized at the full voltage of circuit 8.

In operation, the connection of the elements of the load circuit being effected as shown in Fig. 2, the converter may be placed in operation as above described with respect to the embodiment illustrated in Fig. 1. The initial commutation of the converter is effected by the energy stored in capacitor 12, resistor 58 having a resistance which may be comparable to the impedance of coil 9 for normal operating frequency or may have a lower value sufficient to prevent excessive dissipation of the stored energy of the capacitor through coil 9.

When operation of the converter is established, the voltage impressed from circuit 8 on winding 65 and on the coil of switch 66 through rectifier 67 increases gradually to its normal operating value. Winding 65 gradually saturates the core of reactor 63, thereby causing the reactance of the reactor to decrease gradually. Resistor 58 is thus gradually short circuited, and coil 9 is supplied through winding 64 with current of increasing magnitude. When the voltage of circuit 8 reaches a predetermined value, switch 66 closes to short circuit winding 64 and resistor 58, thereby reducing the losses in the circuit.

When the converter is in normal operation switch 79 may be closed to cause switch 73 to connect coil 71 with circuit 8. At the moment of closure of switch 73, reactor 75 is desaturated and therefore has a substantial impedance. The sudden connection of coil 71 and capacitor 72 with circuit 8 is thereby prevented from disturbing the supply of commutation current to the converter from capacitor 12. Upon closure of switch 73 rectifier 78 supplies saturating current to winding 76 and reactor 75 is thereby gradually saturated at a rate determined by the inductance of winding 76 to enable coil 71 to operate at substantially the full voltage of circuit 8. Capacitor 72 supplies the reactive component of the current of coil 71 and may also supply to converter 6 the additional amount of commutating current required to insure proper commutation under the increased load condition resulting from the connection of coil 71 with circuit 8.

Coil 81 and any further inductor coils that may be provided may similarly be connected with circuit 8 without disturbing the commutation of the converter. When coil 71 is to be deenergized, switch 79 is returned to the position shown. The supply of current from rectifier 78 to coil 76 is thereby interrupted and coil 76 discharges the magnetic energy stored in reactor 75 through resistor 77. The opening of switch 73 is delayed so that the reactor has had time to become substantially desaturated before switch 73 opens. Switch 73 therefore is required to interrupt only a relatively small current and the switching operation takes place without disturbance in the commutating process of the converter.

Capacitors 72 and 82 may also be so dimensioned that each capacitor supplies only the reactive current required by the associated inductor coil without contributing to the supply of commutating current to the converter. The power factor of the current in conductor 74 is thereby raised to substantially unity and the losses in the conductor are reduced. Capacitor 12 then supplies the entire commutating current for the converter, but the losses in the system are not substantially increased thereby because of the shortness of the connection between capacitor 12 and winding 22.

The load constituted by a charge of metal to be melted in an induction furnace varies continually and the commutating current required by the converter varies substantially in proportion to the load. To maintain the efficiency of the converter at its highest possible value, it is necessary to supply to the converter the least possible amount of commutating current. During periods in which coil 9 is running idle this result may be obtained by opening switch 61 and reversing the position of switch 68 to connect reactor winding 64 in series with coil 9 across circuit 8.

Assuming that capacitors 12, 72 and 82 fail to supply sufficient commutating current to converter 6, a portion of rheostat 69 is inserted in series with winding 65. Reactor 63 is thereby desaturated to a corresponding extent and the reactive current taken by coil 9 is decreased, whereby the capacitors are enabled to supply a larger amount of commutating current to the converter. If the capacitors supply an excessive amount of commutating current to the converter, coil 9 may be short circuited by switch 62 to connect reactor winding 64 across circuit 8. The reactor then draws an increased current which may be adjusted by manipulation of rheostat 69 to reduce the commutating current supplied to the converter by the capacitors in accordance with the load variations.

If coils 71 and 81 are lightly loaded so that capacitors 72 and 82 alone supply an excess of commutating current to converter 6, capacitor 12 may be operatively disconnected from circuit 8 by opening switch 59 and the commutating current may again be regulated by varying the saturation of reactor 63 by means of rheostat 69. As is well known, variations of commutating current reflect on the magnitude and frequency of the voltage of circuit 8, and these quantities may therefore be given any desired variations by adjustment of reactor 63 when other regulating means are not provided.

In the embodiment partially illustrated in Fig. 3, coil 9 is assumed to be connected across circuit 8 through a resistor 85 bridged by a switch 86. The closing coil of the switch is energized from circuit 8 through a rectifier 87. Resistor 85 has a resistance which decreases upon increasing flow of current through the resistor. The resistor may accordingly be made of a material such as silicon carbide, the resistance of which varies in a predetermined relation to the value of the current, or a material such as carbon, the resistance of which decreases as a result of elevation of temperature produced by the flow of current.

During initiation of the operation of converter 6, resistor 85 has a relatively high resistance and capacitor 12 is thereby enabled to become charged to a voltage, which is sufficient to result in the storage of the energy required for commutation, but which is substantially lower than the normal operating voltage of circuit 8. When normal operation of the converter is established, the voltage of circuit 8 rises gradually to its normal value and circuit 8 supplies an increasing current to coil 9 through resistor 85. As a result of the resistance characteristic of resistor 85 or of the gradual heating of the resistor, the resistance of the resistor gradually decreases from a relatively high value to a negligibly low value. When the voltage of circuit 8 reaches a predetermined value switch 86 short circuits resistor 85 to reduce the losses in the circuit.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, an electric current supply circuit, a current converting system comprising a plurality of electric valves connected with said supply circuit, an alternating current load circuit connected with said system, said load circuit comprising storage means for supplying commutating current to said system and having a negligible impedance for a limited range of frequencies below normal operating frequency, and means for initiating the operation of said system comprising means operable upon deenergization of said load circuit for increasing the impedance of said load circuit to a substantial value for all frequencies within said range.

2. In combination, an electric current supply circuit, a current converting system comprising a plurality of electric valves connected with said supply circuit, an alternating current load circuit connected with said system, said load circuit comprising storage means for supplying commutating current to said system and having a substantial impedance for a range of frequencies including normal operating frequency, and means responsive to energization of said load circuit from said supply circuit through said system for decreasing the impedance of said load circuit to a negligible value for a range of frequencies below said operating frequency.

3. In combination, an electric current supply circuit, a current converting system comprising a plurality of electric valves connected with said supply circuit, an alternating current load circuit connected with said system and comprising a first capacitor serially connected with the parallel combination of an inductive winding and a second capacitor for supplying commutating current to said system, and means responsive to energization of said load circuit from said supply circuit through said system for short circuiting said first capacitor.

4. In combination, an electric current supply circuit, a current converting system comprising a plurality of electric valves connected with said supply circuit, an alternating current load circuit connected with said system and comprising a capacitor connected in parallel with the series combination of an inductive winding and a resistor whereby said capacitor supplies commutating current to said system, and means responsive to energization of said load circuit from said supply circuit through said system for short circuiting said resistor.

5. In combination, an electric current supply circuit, a current converting system comprising a plurality of electric valves connected with said supply circuit, an alternating current load circuit connected with said system and comprising a capacitor connected in parallel with the series combination of an inductive winding and a resistor whereby said capacitor supplies commutating current to said system, and means responsive to energization of said load circuit from said supply circuit through said system for gradually short circuiting said resistor.

6. In combination, an electric current supply circuit, a current converting system comprising a plurality of electric valves connected with said supply circuit, and an alternating current load circuit connected with said system and comprising a capacitor connected in parallel with the series combination of an inductive winding and of a resistor, said capacitor supplying commutating current to said system, said resistor having a resistance which decreases upon increasing flow of current therethrough whereby said resistance varies from a relatively high value to a relatively low value in response to energization of said load circuit from said supply circuit through said system.

7. In combination, an electric current supply circuit, a current converting system comprising a plurality of electric valves connected with said supply circuit, an alternating current load circuit connected with said system and comprising the parallel combination of a resistor and a first capacitor serially connected with the parallel combination of an inductive winding and a second capacitor for supplying commutating current to said system, and means responsive to energization of said load circuit from said supply circuit through said system for short circuiting said first capacitor and said resistor.

8. In combination, an electric current supply circuit, a current converting system comprising a plurality of electric valves connected with said supply circuit, an alternating current load circuit connected with said system and comprising a capacitor connected in parallel with the series combination of an inductive winding and a resistor, said capacitor supplying commutating current to said system, said resistor having a resistance which decreases upon increasing flow of current therethrough whereby said resistance varies from a relatively high value to a relatively low value in response to energization of said load circuit from said supply circuit through said system, and means responsive to said energization of said load circuit for short circuiting said resistor.

9. In combination, an electric current supply circuit, a current converting system comprising a plurality of electric valves connected with said supply circuit, an alternating current load circuit connected with said system, said load circuit comprising storage means for supplying commutating current to said system and having a substantial impedance for a range of frequencies including normal operating frequency, means for initiating and controlling the flow of energy from said supply circuit to said load circuit through said system comprising control electrodes of said valves and means connecting said control electrodes with said load circuit for impressing on said electrodes an alternating potential component leading the voltage of said load circuit, and means responsive to energization of said load circuit for decreasing the impedance of said load circuit to a negligible value for a range of frequencies below said operating frequency.

10. In combination, an electric current supply circuit, a current converting system comprising a plurality of electric valves connected with said supply circuit, an alternating current load circuit connected with said system, said load circuit comprising storage means for supplying commutating current to said system and having a substantial impedance for a range of frequencies including normal operating frequency, means for initiating and controlling the flow of energy from said supply circuit to said load circuit through said system comprising control electrodes of said valves and means connecting said control electrodes with said load circuit for impressing on said control electrodes an alternating potential component leading the voltage of said load circuit and a negative unidirectional potential component, and means responsive to energization of said load circuit for decreasing the impedance of said load circuit to a negligible value for a range of frequencies below said operating frequency.

11. In combination, an electric current supply circuit, a current converting system comprising a plurality of electric valves connected with said supply circuit, an alternating current load circuit connected with said system, said load circuit comprising storage means for supplying commutating current to said system and having a substantial impedance for a range of frequencies including normal operating frequency, means for initiating and controlling the flow of energy from said supply circuit to said load circuit through said system comprising control electrodes of said valves and means connecting said control electrodes with said load circuit for impressing on said control electrodes an alternating potential component leading the voltage of said load circuit, means responsive to energization of said load circuit for decreasing the impedance of said load circuit to a negligible value for a range of frequencies below said operating frequency, and means responsive to the magnitude of the voltage of said load circuit for varying the ratio of the magnitudes of said control electrode potential and of said load circuit voltage.

12. In combination, an electric current supply circuit, a current converting system comprising a plurality of electric valves connected with said supply circuit, an alternating current load circuit connected with said system, said load circuit comprising storage means for supplying commutating current to said system, means for initiating and controlling the flow of energy from said supply circuit to said load circuit through said system and the supply of commutating current from said load circuit to said system comprising control electrodes of said valves and means connecting said control electrodes with said load circuit for impressing on said control electrodes an alternating potential component leading the voltage of said load circuit, and means responsive to the magnitude of the voltage of said load circuit for varying the ratio of the magnitudes of said control electrode potential and of said load circuit voltage.

13. In combination, an electric current supply circuit, an alternating current load circuit, a current converting system comprising a plurality of electric valves interconnecting said circuits, and means for initiating the operation of said system comprising impedance means serially connected with an element of said load circuit and means responsive to the voltage of said load circuit for short circuiting said impedance means.

14. In combination, an electric current supply circuit, an alternating current load circuit, a current converting system comprising a plurality of electric valves interconnecting said circuits, a saturable reactor serially connected with an element of said load circuit, and means responsive to energization of said load circuit from said supply circuit through said system for saturating said reactor.

15. In combination, an electric current supply circuit, an alternating current load circuit, a current converting system comprising a plurality of electric valves interconnecting said circuits, a saturable reactor serially connected with an element of said load circuit, means responsive to energization of said load circuit from said supply circuit through said system for saturating said reactor, and means responsive to increase of the voltage of said load circuit beyond a predetermined value for short circuiting said reactor.

16. In combination, an electric current supply circuit, an alternating current load circuit, a current converting system comprising a plurality of electric valves interconnecting said circuits, and means for controlling the operation of said system comprising a shunt circuit connected across said load circuit, said shunt circuit comprising a saturable reactor, and means for controlling the saturation of said reactor.

17. In combination, an electric current supply circuit, a current converting system comprising a plurality of electric valves connected with said supply circuit, an alternating current load circuit having a proximate point connected with said system and a remote connection point, an inductive winding connected with said remote point, a capacitor connected in parallel with said winding at said remote point to raise the power factor of the current in said load circuit to substantially unity, and a second capacitor connected across said load circuit at said proximate point to supply commutating current to said system.

18. In combination, an electric current supply circuit, a current converting system comprising a plurality of electric valves connected with said supply circuit, an alternating current load circuit having a proximate point connected with said system and a remote connection point, a variable load connected with said load circuit at said remote point, a capacitor connected with said load circuit at said proximate point to supply commutating current to said system, and means for adjusting said commutating current in accordance with the variations of said load.

19. In combination, an electric current supply circuit, a current converting system comprising a plurality of electric valves connected with said supply circuit, an alternating current load circuit connected with said system, said load circuit comprising storage means for supplying commutating current to said system and having a substantial impedance for a range of frequencies including normal operating frequency, means for initiating the flow of energy between said circuits through said system comprising means for rendering said valves conductive to cause the flow of pulsating currents through said valves, whereby transient currents are induced in said load circuit for supplying energy to said storage means, and means responsive to energization of said load circuit from said supply circuit through said system for decreasing the impedance of said load circuit to a negligible value for a range of frequencies below said operating frequency.

20. The method of establishing normal operation of a current converter of the electric valve type comprising the steps of loading the converter with a load circuit having a substantial impedance for a range of frequencies including a normal operating frequency, initiating the flow of current through the converter to the load circuit, and decreasing the impedance of the load circuit to a negligible value for a range of frequencies below the normal operating frequency.

21. The method of operating a current converter of the electric valve type connectable with a load comprising a saturable reactor comprising the steps of maintaining the reactor saturated during normal operation of the converter supplying current to the load and of maintaining the reactor desaturated during switching operations between the converter and the load.

22. In combination, an electric current supply circuit, a current converter of the electric valve type connected with said supply circuit, a load circuit connected with said converter, and means responsive to deenergization of said load circuit for increasing the impedance of said load circuit.

23. In combination, an electric current supply circuit, a current converter of the electric valve type connected with said supply circuit, a load circuit connected with said converter, and means responsive to energization of said load circuit for decreasing the impedance of said load circuit.

24. In combination, an electric current supply circuit, a current converter of the electric valve type connected with said supply circuit, an alternating current load circuit connected with said converter for supplying commutating current to said converter, a variable load connected with said load circuit, and means distinct from said load for adjusting the magnitude of said commutating current.

25. The method of operating a current converter of the electric valve type comprising the steps of operatively connecting the converter with an alternating current load, and of adjusting the commutating current of the converter in accordance with variations of the load.

LAUREN L. JOHNSON.

REFERENCES CITED

The following references are of record in the file of this patent:

UNITED STATES PATENTS

| Number | Name | Date |
| --- | --- | --- |
| 1,802,677 | Slepian | Apr. 28, 1931 |
| 2,147,474 | Wazner et al. | Feb. 14, 1939 |